Patented June 16, 1942

2,286,251

UNITED STATES PATENT OFFICE 2,286,251

INTERPOLYMERS AND PREPARATION OF SAME

Harold W. Arnold, Marshallton, Del., assignor to E. I. du Pont de Nemours & Company, Wilmington, Del., a corporation of Delaware No Drawing. Application June 5, 1940, Serial No. 338,892

9 Claims. (Cl. 260—78)

This invention relates to new polymeric products and, more particularly, to such products formed by the polymerization of alpha-halogen substituted acrylic derivatives and esters of alpha, beta-ethylene dicarboxylic acids.

A variety of alpha-halogen substituted acrylic derivatives are known to the prior art, and their polymerization leads to products which have many desirable properties so far as their applications to the field of plastics are concerned. The polymers of the lower alkyl esters of alpha-chloroacrylic acid are particularly valuable because of their high softening points, their hardness, and their resistance to burning. However, one outstanding disadvantage in the use of such polymers is their tendency to undergo discoloration when exposed to light and heat, and this characteristic greatly limits their applications and uses.

An object of the present invention is to provide new and useful synthetic resins. A further object is to provide new and useful coating compositions. A still further object is to provide an interpolymer containing substantial amounts of an alpha-halogen acrylic derivative which possesses unusual stability to the effect of both light and heat. A still further object is the provision of means for practically and economically preparing interpolymers of alpha-halogen acrylic derivatives and esters of alpha, beta-ethylene dicarboxylic acids. Other objects of the invention will be apparent from the descriptions hereinafter given.

The above objects are accomplished according to the present invention by mixing polymerizable alpha-halogen, alpha-methylene compounds in which the reference carbon atom is joined by a multiple bond to a dissimilar atom and esters of alpha, beta-ethylene dicarboxylic acids and subjecting the mixture to polymerization conditions wherein preferably oxidation and/or hydrolysis are minimized. The resulting interpolymer should not contain more than 40 per cent by weight of the ester of dicarboxylic acid.

It has been discovered, according to the present invention, that interpolymers of polymerizable alpha-halogen, alpha-methylene compounds wherein the reference carbon atom is joined by a multiple bond to a dissimilar atom and esters of alpha, beta-ethylene dicarboxylic acids are not seriously discolored when exposed to heat and light. In carrying out this interpolymerization, any of the well-known methods may be utilized; but it is preferable to select polymerization conditions wherein oxidation and/or hydrolysis of the monomeric or polymeric materials are reduced to a minimum. Such conditions include low temperatures, low concentrations or complete absence of oxygen liberating catalyst, minimum contact with air, and relatively short time contact with aqueous media.

A preferred method of carrying out the preferred polymerization involves heating a mixture of a polymerizable alpha-halogen, alpha-methylene compound wherein the reference carbon atom is joined by a multiple bond to a dissimilar atom and an ester of an alpha, beta-ethylene dicarboxylic acid under low polymerization temperatures (between 40 and 80° C.) in the presence of small amounts of polymerization catalyst, and in such a manner that hydrolysis and/or oxidation are minimized as far as possible. Since, in the emulsion and the so-called granular method of polymerization, the monomer is exposed in a finely divided state to water and oxygen at relatively high temperatures, these methods are not ordinarily satisfactory in preparing the interpolymers of the present invention. The bulk method of polymerization, however, is entirely suitable. Several modifications of the bulk polymerization method are available and may be conveniently employed. In a preferred modification of the bulk polymerization method, the interpolymerization may be carried out by heating the mixture of monomers in a suitable non-corrosive vessel equipped with a reflux condenser at carefully controlled temperatures (40–80° C.) under a moderate vacuum. The vacuum may be adjusted at the temperature of polymerization so that moderate refluxing of the monomeric mixture occurs. If over-heating of the mass should occur, due to the exothermic reaction, self-cooling is effected through an increase in the rate of reflux. In employing this method of polymerization, the usual peroxidic-type of polymerization catalyst may be advantageously omitted, since the process proceeds at a rate sufficiently rapid to be commercially feasible.

Employing the above method of polymerization, the finished polymer is produced in the form of a clear, colorless, brilliant, hard, and tough mass, and the resulting product possesses a high degree of stability with respect to both light and heat. To remove any traces of monomeric materials, the vessel containing the mass of polymer is subjected to a high vacuum without refluxing and at elevated temperatures for a short time; i. e. 100° C. for one-half to one hour.

Another suitable method of interpolymerization consists of heating the monomeric mixture in a vessel of any size or shape in the presence or absence of a peroxidic-type catalyst. In order to minimize oxidation effects, it is frequently advisable to flush out the polymerization vessel after the introduction of the monomeric mixture by means of a gas, non-reactive under the conditions, such as nitrogen, hydrogen, or carbon dioxide, and to conduct the polymerization in a closed vessel to avoid the entrance of oxygen. In the production of cast products from the interpolymers of the present invention, it is frequently advisable to start with a thick syrup which consists of the preformed polymer dissolved in an appropriate monomeric mixture. According to the known methods, it is possible to produce the casting in the form of solid rods, hollow tubes, sheets, solid blocks, and the like.

When it is desired to use the interpolymers of the present invention in coating compositions, the polymerization may be carried out by the solution method wherein the monomeric mixture and catalyst, if desired, are dissolved in an appropriate solvent such as aromatic hydrocarbons, acetone, dioxan, or esters and the mixture heated until polymerization is completed. The products obtained by this method are in the form of a more or less viscous solution which may be applied directly with or without further modification as coating compositions.

The polymerization may also be carried out in non-aqueous non-solvent liquids such as aliphatic alcohols or aliphatic hydrocarbons in which the interpolymers are not soluble. By this method, the polymers are precipitated as they are formed, usually in the form of finely divided powders which may be used advantageously in molding operations, or dissolved in appropriate solvents to produce coating compositions.

The polymerizable alpha-halogen, alpha-methylene compounds in which the reference carbon atom is joined by a multiple bond to a dissimilar atom, particularly the esters, tend to polymerize readily even at low temperatures and also undergo degradation when stored for long periods of time, and when exposed to oxygen, water, vapor, or light. Monomers used in the preparation of the interpolymer must have a high state of purity and, preferably, should be distilled immediately prior to their use. This serves to remove traces of polymeric or degraded products which may have accumulated during storage. The distillation is preferably carried out under vacuum or in contact with nitrogen and in the presence of a reducing agent. A further method of purification involves the fractional crystallization of monomer which has been stored for only short periods of time and, thus, contains no polymers and only small traces of the degradation products.

The polymerizable alpha-halogen, alpha-methylene compounds in which the reference carbon atom is joined by a multiple bond to a dissimilar atom are relatively new materials from the standpoint of polymerization and may conveniently be prepared by either one or the other of the two following methods: (1) the dehydrohalogenation of alpha, beta-dichloropropionic derivatives by means of tertiary amines such as dimethylaniline, or (2) the reaction of trichloroethylene with formaldehyde in the presence of concentrated sulfuric acid followed by dehydration and esterification with methanol according to the method disclosed in U. S. Patent No. 2,233,835, granted March 4, 1941 and entitled "Manufacture of halogenated organic acids containing three carbon atoms and derivatives thereof. The latter method is best adapted to the preparation of alpha-halogen acrylic acids or its esters. This method is preferable to method (1) because of the fact that the products are much more readily purified to the high state of purity required in monomers to be used in the production of the interpolymers of the present invention.

The alpha, beta-ethylene dicarboxylic esters may be prepared by the reaction of the appropriate acids or anhydrides with alcohols, using standard esterification procedures.

In the following examples, which illustrate specific embodiments of the invention, all parts are given by weight unless otherwise stated.

*Example 1*

A mixture of 87.5 parts of methyl alpha-chloroacrylate and 12.5 parts of dimethyl fumarate was heated at 50° C. in a closed vessel for 65 hours. At the end of this time, the mixture had polymerized to a clear, brilliant, tough, and colorless solid. A portion of the resulting interpolymer was molded at 160° C. without developing any noticeable color. Methyl alpha-chloroacrylate, when polymerized alone under the same conditions, produced a clear, brilliant mass which, on molding at 160° C., became dark amber in color.

*Example 2*

The following compounds and mixtures were heated at 65° C. for 65 hours:

(a) 50 parts of methyl alpha-chloroacrylate and 2 parts of ethylene oxide.

(b) 50 parts of methyl alpha-chloroacrylate and 2 parts sulfur dioxide.

(c) 40 parts of methyl alpha-chloroacrylate.

(d) 36 parts of methyl alpha-chloroacrylate and 4 parts dimethyl fumarate.

(e) 36 parts of methyl alpha-chloroacrylate and 4 parts diethyl fumarate.

(f) 36 parts of methyl alpha-chloroacrylate and 4 parts dimethyl maleate.

(g) 36 parts of methyl alpha-chloroacrylate and 4 parts diethyl maleate.

All of the above mixtures polymerized to solid blocks. With the exception of the product obtained from (a), all the polymers were clear, colorless, and brilliant; (a) having developed a slight yellow color. Portions of each of the remaining polymers were molded into small discs. These discs were exposed to ultra-violet light for a period of 48 hours, portions of each disc being covered to exclude the light therefrom. The relative order of stability of these polymers, as judged by color formation in the exposed portion of the disc, was: (e), (g), (d), (f), (c), and (b); (e) being substantially unaffected, while (b) and (c) had become much darker than the remaining polymers.

It will be understood that the above examples are merely illustrative, and that the present invention broadly comprises as a new composition a stabilized, colorless interpolymer of a polymerizable alpha-halogen, alpha-methylene compound in which the reference carbon atom is joined by a multiple bond to a dissimilar atom and an ester of an alpha, beta-ethylene dicarboxylic acid and the preparation of the interpolymer by subjecting the polymer-free polymerizable alpha-halogen acrylic derivative and the polymer-free ester of an alpha, beta-ethylene dicarboxylic acid to polymerization conditions.

Among the polymerizable alpha-halogen substituted acrylic derivatives contemplated for use in the present invention may be mentioned any of the polymerizable alpha-halogen, alpha-methylene compounds in which the reference carbon atom is joined by a multiple bond to a dissimilar atom. The acid, esters, amides, and nitrile of these alpha-halogen substituted acrylic derivatives are, however, preferred. Among the polymerizable alpha-halogen substituted acrylic derivatives adapted for use in the present invention in addition to those previously disclosed in the examples may be mentioned: butyl, phenyl, benzyl, cyclohexyl, and methoxyethyl esters of alpha-chloro- and alpha-bromoacrylic acids; alpha-bromo- and alpha-chloroamides or N-substituted derivatives thereof, and the like. It is more specifically preferred, however, that the alpha-chloroacrylic acid derivatives, such as the acid, esters, nitrile and amides, be employed, as these are more stable than the corresponding alpha-bromoacrylic compounds and are more readily accessible.

The esters of alpha, beta-ethylene dicarboxylic acids contemplated within the present invention are those obtained from maleic and fumaric acids. Any of the alkyl, aralkyl, cycloalkyl, and aryl esters of these acids are operable. Specific esters of these acids include: methyl, ethyl, butyl, amyl, octyl, benzyl, phenyl, cyclohexyl, methoxyethyl, and the like. Because of their availability and low cost, diethyl and dimethyl esters of these acids are especially preferred.

In general, the physical properties of the interpolymer will be dependent principally on the monomeric proportions employed. Increases in the percentage of the ester of the alpha, beta-dicarboxylic acid produces lower softening, more flexible, and tougher products. When improved color stability to heat and light are desired, the resulting polymer should not contain more than a 40% by weight of the ester of alpha, beta-ethylene dicarboxylic acid. Products with higher percentages are characterized by a low softening point.

The usual polymerization catalysts are effective in promoting the interpolymerization of these polymeric products. Among such catalysts may be mentioned: hydrogen peroxide, peracetic acid, inorganic perborates and persulfates, benzoyl peroxide, acetyl benzoyl peroxide, dilauroyl peroxide, dibutyryl peroxide, and succinyl peroxide. Sulfur dioxide is also an effective catalyst. In cases where the peroxidic-type catalysts are employed, it is highly desirable that the concentration be kept low (below 0.8% approximately) to minimize the danger of oxidation of the monomeric or polymeric material. The preferred catalyst concentration range is 0.01–0.3%.

Stabilizing agents such as, for example, as ethylene oxide may be added in small proportions to the monomeric compounds prior to polymerization to improve the stability of the polymeric halogen-containing compounds.

The polymerization may be carried out at any temperature between approximately 30° C. and approximately 120° C., the preferred range being about 40–80° C.

The time required for polymerization is largely dependent on the conditions used, and may vary from several hours to several days.

Regardless of the method of polymerization employed, it is desirable that the conditions used in the interpolymerization should be such that the danger of any extensive oxidation and/or hydrolysis of the monomers and/or interpolymers be reduced to a minimum.

The interpolymers herein described, as previously pointed out, may be prepared in bulk in containers of any shape to give castings having the shape of the container. They may also be shaped or formed by sawing, drilling, filling, turning, etc. These interpolymers may also be molded by the known methods of molding, and may be formed into foils or films by casting from solutions or by hot pressing. Also, solutions of the interpolymers may be spun to produce synthetic fibers, or used as adhesives for various common materials. The interpolymers are of value as an electrical insulating material and in applications requiring resistance to burning. They are adapted for the preparation of molded articles when modified with plasticizers or softeners, fillers, pigments, dyes, and other natural or synthetic resins. They may also be used as coating compositions either alone or when mixed with other resins, pigments, dyes, and plasticizers or softeners. Such compositions may be used for coating or impregnating surfaces such as wood, textiles, leather, metals, glass, paper, stone, brick, plaster, and the like.

An advantage of the present invention is that it provides a new interpolymer having superior properties which adapt it for uses in the plastic and coating field. A further advantage is that the invention provides a new polymer which is clear and highly stable to both heat and light.

As many apparently widely different embodiments of this invention may be made without departing from the spirit and scope thereof; it is to be understood that the invention is not limited to the specific embodiments thereof except as defined in the appended claims.

I claim:

1. An interpolymer of methyl alpha-chloroacrylate and diethyl fumarate, the resulting interpolymer containing not more than 40% by weight of the diethyl fumarate and being characterized by its stability to light and heat.

2. An interpolymer of a polymerizable compound from the group consisting of the alpha-halogen substituted acrylic acids, and esters, amides, and nitriles thereof, interpolymerized with diethyl fumarate, the resulting interpolymer containing not more than 40% by weight of the diethyl fumarate.

3. An interpolymer of a polymerizable compound from the group consisting of the alpha-halogen substituted acrylic acids, and esters, amides, and nitriles thereof, interpolymerized with dimethyl fumarate, the resulting interpolymer containing not more than 40% by weight of the dimethyl fumarate.

4. An interpolymer of a polymerizable compound from the group consisting of the alpha-halogen substituted acrylic acids, and esters, amides, and nitriles thereof, interpolymerized with diethyl maleate, the resulting interpolymer containing not more than 40% by weight of the diethyl maleate.

5. Process comprising subjecting to polymerizing conditions a mixture of a polymer-free freshly distilled polymerizable compound from the group consisting of the alpha-halogen substituted acrylic acids, and esters, amides, and nitriles thereof, and a polymer-free freshly distilled ester of an alpha, beta-ethylene dicarboxylic acid with a member of the class consisting of saturated monohydric alcohols and monohydric phenols, in proportions of not more than 40% by weight of the ester of the dicarboxylic acid.

6. Process comprising subjecting to polymerizing conditions a mixture of a polymer-free freshly distilled polymerizable compound from the group consisting of the alpha-halogen substituted acrylic acids, and esters, amides, and nitriles thereof, and a polymer-free freshly distilled ester of an alpha, beta-ethylene dicarboxylic acid with a member of the class consisting of saturated monohydric alcohols and monohydric phenols, in proportions of not more than 40% by weight of the dicarboxylic acid, until converted to a solid mass, the temperature of the reaction mixture being maintained between 40°–80° C.

7. Process comprising subjecting to polymerizing conditions a mixture of a polymer-free freshly distilled polymerizable compound from the group consisting of the alpha-halogen substituted acrylic acids, and esters, amides, and nitriles thereof, and a polymer-free freshly distilled ester of an alpha, beta-ethylene dicarboxylic acid with a member of the class consisting of saturated monohydric alcohols and monohydric phenols, in proportions of not more than 40% by weight of the ester of the dicarboxylic acid, the operation being carried out under temperature and pressure conditions such that the rate of reflux will maintain the temperature of the reaction mixture between 40°–80° C.

8. An interpolymer of a polymerizable compound from the group consisting of the alpha-halogen substituted acrylic acids, and esters, amides, and nitriles thereof, interpolymerized with an ester of an alpha, beta-ethylene dicarboxylic acid with a member of the class consisting a saturated mono hydric alcohols and monohydric phenols, the resulting interpolymer containing not more than 40% by weight of the ester of the dicarboxylic acid and being characterized by its stability to heat and light.

9. An interpolymer of methyl alpha-chloroacrylate and an ester of an alpha, beta-ethylene dicarboxylic acid with a member of the class consisting of saturated monohydric alcohols and monohydric phenols, the resulting interpolymer containing not more than 40% by weight of the ester of the dicarboxylic acid and being characterized by its stability to heat and light.

HAROLD W. ARNOLD.